United States Patent
Le et al.

(10) Patent No.: US 11,734,282 B1
(45) Date of Patent: Aug. 22, 2023

(54) METHODS AND SYSTEMS FOR PERFORMING A VECTORIZED DELETE IN A DISTRIBUTED DATABASE SYSTEM

(71) Applicant: Microsoft Technology Licensing, LLC, Redmond, WA (US)

(72) Inventors: Wangchao Le, Redmond, WA (US); Marc Todd Friedman, Seattle, WA (US); Hiren Patel, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/708,545

(22) Filed: Mar. 30, 2022

(51) Int. Cl.
*G06F 16/24* (2019.01)
*G06F 16/2455* (2019.01)
*G06F 16/28* (2019.01)
*G06F 16/21* (2019.01)
*G06F 16/27* (2019.01)

(52) U.S. Cl.
CPC ........ *G06F 16/2456* (2019.01); *G06F 16/219* (2019.01); *G06F 16/27* (2019.01); *G06F 16/285* (2019.01)

(58) Field of Classification Search
CPC .... G06F 16/2456; G06F 16/219; G06F 16/27; G06F 16/273; G06F 16/275; G06F 16/278; G06F 16/285
See application file for complete search history.

(56) References Cited

U.S. PATENT DOCUMENTS

| | | | |
|---|---|---|---|
| 2003/0113029 A1* | 6/2003 | McLaughlin | H04N 19/503 375/E7.255 |
| 2009/0006399 A1* | 1/2009 | Raman | G06F 16/2453 707/E17.046 |
| 2013/0290282 A1* | 10/2013 | Faerber | G06F 16/28 707/693 |
| 2014/0172804 A1* | 6/2014 | Kaufmann | G06F 16/10 707/649 |
| 2016/0004762 A1* | 1/2016 | Tyercha | G06F 16/221 707/737 |
| 2021/0406251 A1 | 12/2021 | Kläbe et al. | |

OTHER PUBLICATIONS

Klabe, et al., "Updatable Materialization of Approximate Constraints", In Conference of IEEE 37th International Conference on Data Engineering (ICDE), IEEE, Apr. 19, 2021, pp. 1991-1996.
"International Search Report and Written Opinion Issued in PCT Application No. PCT/US2023/011190", dated May 8, 2023, 16 Pages.

* cited by examiner

*Primary Examiner* — Merilyn P Nguyen
(74) *Attorney, Agent, or Firm* — ArentFox Schiff LLP

(57) ABSTRACT

Example aspects include techniques for performing vectorized delete operations in a distributed database system including clustering multiple files stored in the distributed database system, and generating, for each of the multiple files and based on a deletion signal, a delta array including multiple bits representing the data items in the file and indicating, based on bit value, the target data items to be deleted from the file. Generating, for each of the multiple files, the delta array can include reading at least one second file shard of multiple second file shards before performing a join operation on at least one first file shard of multiple first file shards is completed.

20 Claims, 6 Drawing Sheets

METHODS AND SYSTEMS FOR PERFORMING A VECTORIZED DELETE IN A DISTRIBUTED DATABASE SYSTEM

BACKGROUND

Distributed database systems exist that store data for various entities, clients, business units, etc., across various computing nodes in a network, such as in a cloud computing environment. Data from the distributed database systems can be accessed using a massive parallel query engine, which can have an execution runtime consisting of a chain of operators. In addition, data compliance may be performed for the data in the distributed database system. The data compliance to be performed may be to satisfy requirements specified by a governmental entity, such as General Data Protection Regulation (GDPR) in the European Union (EU). Complying with the GDPR requirements, for example, may include deleting data from the distributed database system that does not comply with (or no longer complies with) the GDPR requirements. Some metrics have suggested that around 20% of compute hours are spent on maintaining data compliance.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

In an aspect, a computer-implemented method for performing a vectorized delete in a distributed database system is provided that includes clustering multiple files stored in the distributed database system, where the clustering is based at least in part on a similarity in a storage scheme used to store data in the multiple files, and generating, for each of the multiple files and based on a deletion signal, a delta array including multiple bits representing data items in the file and indicating, based on bit value, target data items to be deleted from the file. Generating, for each of the multiple files, the delta array can include reading, from a first file of the multiple files, multiple first file shards each including a portion of first data items in the first file, performing, for each of the multiple first file shards, a first join operation with the deletion signal to generate a portion of a first delta array corresponding to a given first file shard, reading, from a second file of the multiple files, multiple second file shards each including a portion of second data items in the second file, and performing, for each of the multiple second file shards, a second join operation with the deletion signal to generate a portion of a second delta array corresponding to a given second file shard. Reading at least one second file shard of the multiple second file shards is performed before the first join operation on at least one first file shard of the multiple first file shards is completed.

In another aspect, a device for performing a vectorized delete in a distributed database system is provided that includes a memory storing instructions, and at least one processor coupled to the memory. The at least one processor is configured to execute the instructions to cluster multiple files stored in the distributed database system, where the clustering is based at least in part on a similarity in a storage scheme used to store data in the multiple files, and generate, for each of the multiple files and based on a deletion signal, a delta array including multiple bits representing data items in the file and indicating, based on bit value, target data items to be deleted from the file. Generating, for each of the multiple files, the delta array includes reading, from a first file of the multiple files, multiple first file shards each including a portion of first data items in the first file, performing, for each of the multiple first file shards, a first join operation with the deletion signal to generate a portion of a first delta array corresponding to a given first file shard, reading, from a second file of the multiple files, multiple second file shards each including a portion of second data items in the second file, and performing, for each of the multiple second file shards, a second join operation with the deletion signal to generate a portion of a second delta array corresponding to a given second file shard. Reading at least one second file shard of the multiple second file shards is performed before the first join operation on at least one first file shard of the multiple first file shards is completed.

In another aspect, a non-transitory computer-readable device storing instructions thereon that, when executed by at least one computing device, causes the at least one computing device to perform operations is provided. The operations includes clustering multiple files stored in the distributed database system, where the clustering is based at least in part on a similarity in a storage scheme used to store data in the multiple files, and generating, for each of the multiple files and based on a deletion signal, a delta array including multiple bits representing data items in the file and indicating, based on bit value, target data items to be deleted from the file. Generating, for each of the multiple files, the delta array includes reading, from a first file of the multiple files, multiple first file shards each including a portion of first data items in the first file, performing, for each of the multiple first file shards, a first join operation with the deletion signal to generate a portion of a first delta array corresponding to a given first file shard, reading, from a second file of the multiple files, multiple second file shards each including a portion of second data items in the second file, and performing, for each of the multiple second file shards, a second join operation with the deletion signal to generate a portion of a second delta array corresponding to a given second file shard. Reading at least one second file shard of the multiple second file shards is performed before the first join operation on at least one first file shard of the multiple first file shards is completed.

In another aspect, an example computer-readable medium storing instructions for performing the methods described herein and an example apparatus including means of performing operations of the methods described herein are also disclosed.

Additional advantages and novel features relating to implementations of the present disclosure will be set forth in part in the description that follows, and in part will become more apparent to those skilled in the art upon examination of the following or upon learning by practice thereof.

BRIEF DESCRIPTION OF THE DRAWINGS

The Detailed Description is set forth with reference to the accompanying figures, in which the left-most digit of a reference number identifies the figure in which the reference number first appears. The use of the same reference numbers in the same or different figures indicates similar or identical items or features.

DETAILED DESCRIPTION

Figure 1:
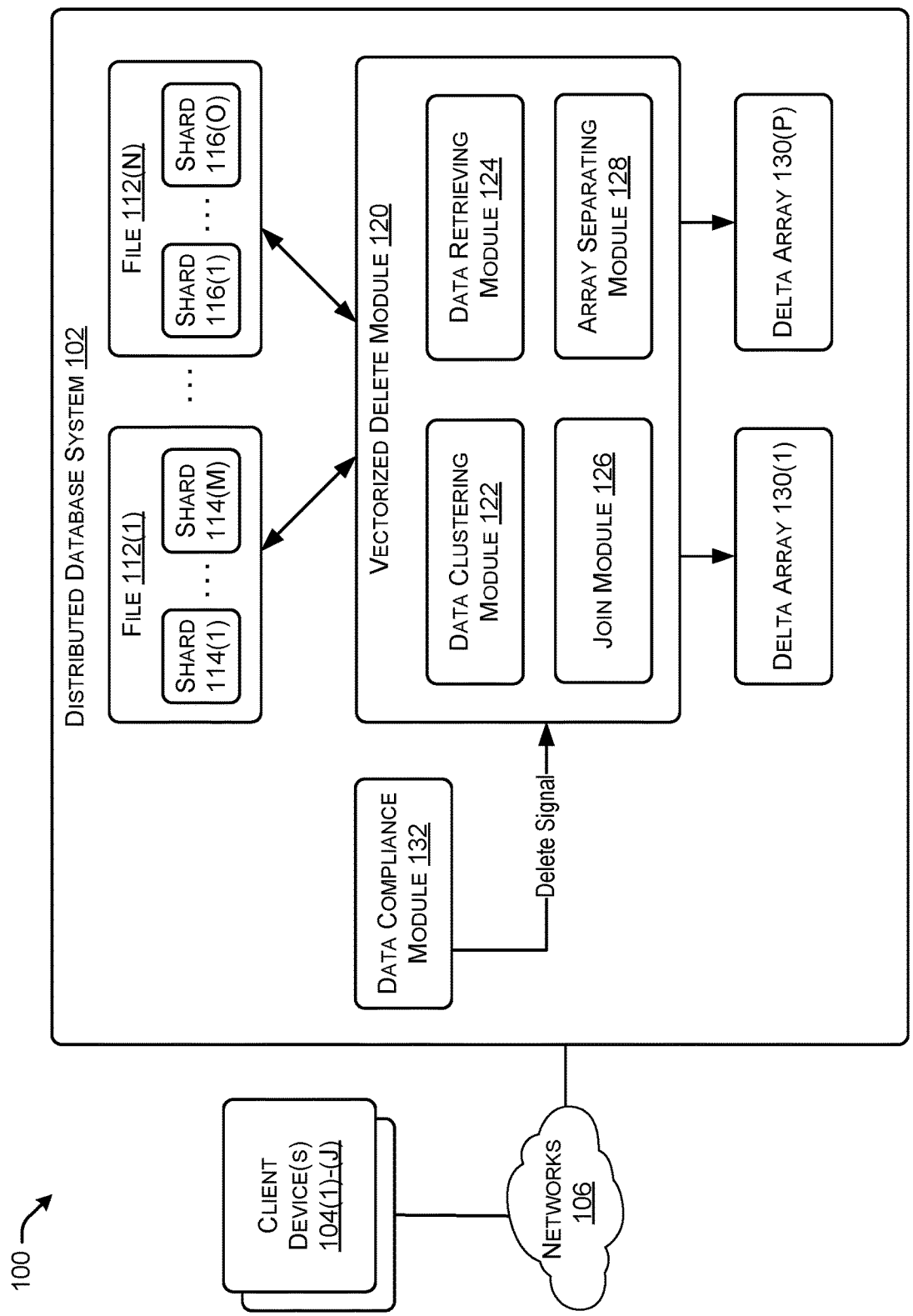
FIG. 1 is a diagram showing an example of a computing system, in accordance with some aspects of the present disclosure

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes techniques for performing vectorized deletes in a distributed database system. A distributed database system may include a database system that can store data across various computing nodes in a network or environment, such as a cloud computing environment. For example, the distributed database system can store data in various files, which may exist on various computing nodes (e.g., servers). For example, the distributed database system can be, or can include, a file system indicating where certain data is stored (e.g., a file location of data in the distributed database system). The distributed database system can include, or can be operable with, a parallel query engine that can interact with the data in the distributed database system to return query results. The parallel query engine, for example, can support queries defined in a structured query language (SQL)-like format, including "SELECT," "JOIN," "DELETE," or similar statements to be performed with the data.

For example, the distributed database system can store data in files as append-only, which can be optimized for input/output (I/O) operations. To store new data, each append can be a trunk/extent of a fixed size (e.g., a number of megabytes), and the file can be immutable once the append is complete. I/O can be performed in parallel, where a row boundary can align with an extent boundary. In addition, in some examples, distributed database systems can use optimized file formats to improve query performance, such as a structured stream. For example, a structured stream can be defined on top of the file system by using indexing and sharding to separate the files into shards based on an index. The shards can also be files that store a portion of the data in the original file. Moreover, in some examples, the shards can be stored on various distributed computing nodes.

In distributed database systems, deletion of data can be performed by maintaining a delta array. For example, the distributed database system can perform a join (or other condition) of the target data and a delete signal including delete keys to output a bit array of deleted rows (the delta array), where one bit value (e.g., '1') can indicate the row is deleted and the other bit value (e.g., '0') can indicate the row is not deleted. When the data is scanned or otherwise read from the file (e.g., for a SELECT query), the distributed database system can read the target data along with the delta array to output rows that are not deleted (e.g., skipping rows marked as deleted).

Data can be deleted from a distributed database system to comply with data regulations, such as General Data Protection Regulation (GDPR) in the European Union (EU). The GDPR can have a grace period for deleting data, and thus the delta array deletion can be used. In a distributed database systems, the same users can typically use similar schemes to store the same series of data, and the user can perform batch deletes of a number of streams. The result after the join operation in deletion can be trivial in size (e.g., a number of kilobytes or megabytes), and most of the processing or latency of the delete operation can be spent waiting on I/O on the target data (e.g., retrieving data across multiple shards of one or more files) and on the join operation to join the target data with the delete signal.

As a user can typically use similar schemes to store the same series of data, target data for possible deletion can be clustered. For example, there can be some homogeneity in data schemes used for storing certain data, such as in indexing, sharding, sorting schemes, etc. In one example, some data may share a sharded storage scheme, such as being sharded as a hash function based on a same key, being sharded as a range based on the same key, etc.

In this regard, aspects described herein relate to clustering of data targets for possible deletion by exploiting the similarities of the data storage scheme. For example, target data that is sharded using the hash function on the same key or range on the same key can be clustered for performing the delete operation. Clustering the target data, in this regard, can allow for a worker thread to scan two different homogeneous shards in parallel to obtain the data for joining with the delete signal and/or to perform the join operation for the two different homogeneous shards in parallel. The delta array can be output in a parallel union with each entry having provenance data to allow for subsequent separation of the entries into respective delta arrays for the delete targets.

Performing these operations in parallel can mitigate wait time otherwise associated with performing the I/O intensive steps one after the other: e.g., retrieving a first shard, joining the first shard with the delete signal, then retrieving the second shard, and joining the second shard with the delete signal. This can significantly improve performance of the delete operations and reduce the amount or proportion of compute hours used for maintaining data compliance.

Illustrative Environment

FIG. 1 is a diagram showing an example of a computing system 100, in accordance with some aspects of the present disclosure.

As illustrated in FIG. 1, the computing system 100 may include or be part of a cloud computing platform where various computing nodes are accessible via one or more networks 106. In one example, the computing system 100 can include a distributed database system 102, which can be distributed across multiple computing nodes in the computing system 100 and accessible to one another, and/or to one or more of a plurality of client devices 104(1)-(j), via one or more networks. The computing system 100 may provide the client devices 104(1)-(j) with distributed storage and access to software, services, files, and/or data via one or more network(s) 106, and/or access to the distributed database system 102 or one or more components thereof to store data, manage stored data, etc. The network(s) 106 may include any one or combination of multiple different types of networks, such as cellular networks, wireless networks, local area networks (LANs), wide area networks (WANs), personal area networks (PANs), the Internet, or any other type of network configured to communicate information between computing devices (e.g., the distributed database system 102 or one or more components thereof, the client devices 104(1)-(j), etc.). Some examples of the client devices 104(1)-(j) include computing devices, smartphone devices, Internet of Things (IoT) devices, drones, robots, process automation equipment, sensors, control devices, vehicles, transportation equipment, tactile interaction equipment, virtual and augmented reality (VR and AR) devices, industrial machines, virtual machines, etc. Further, in some aspects, a client device 104 may include one or more applications configured to interface with the distributed database system 102 to perform queries (e.g., using a query language that can be interpreted and processed by a parallel query engine on the distributed database system 102). The client devices 104(1)-(j) may be associated with customers (i.e. tenants), business units, etc., and can separately store data on the distributed database system 102.

The distributed database system 102 can store data in files, such as files 112(1)-(n). As described, the files 112(1)-(n) can store data by appending the data as an extent to the end of a given file, which optimizes data insertion for sequential I/O. Each append can be a trunk or extent of a fixed size, and the file can be immutable once the append is complete. A file can correspond to a given collection of data for a given client, such as a table of rows/columns. A row boundary can align with an extent boundary, such that each extent may be or include one or more rows of the table. In an example, client devices 104(1)-(j) can store data in the distributed database system 102 in this regard, which may include using the query language (e.g., an INSERT command) to inserts data. The distributed database system 102 can manage inserting the data into the database by appending the data to an appropriate one or more of the files 112(1)-(n).

In addition, for example, the distributed database system 102 can store the file as multiple shards (e.g., shards 114(1)-(m) for file 112(1), shards 116(1)-(o) for file 112(n), etc.). For example, the shards may correspond to structured streams that can be generated by indexing and sharding each file based on the index. For example, each shard can include indexing and metadata, which can indicate one or more of statistics of the shard, a sharding scheme, a location of a shard, seekability within a shard, etc. In one example, the shards can be created by a user (e.g., by a client device 114(1)-(j)) that manages its data stored in the distributed database system 102. In one example, the shards may be generated using a hash function on a key value in the data and/or may be ordered based on the same key value or another key value in the data. In another example, the shards may be generated using a range function on a key value in the data and/or may be ordered based on the same key value or another key value in the data. In some examples, some files 112(1)-(n) may have similarity in storage scheme, such as similar sharding (e.g., sharded using a same or similar key), similar indexing, similar sorting, etc. As described in further detail herein, files having similarity in storage scheme may be clustered for vectorized deletion operations.

In an aspect, distributed database system 102 can include a vectorized delete module 120 that can perform vectorized delete operations on data stored in files (e.g., files 112(1)-(n)). Vectorized delete module 120 can include a data clustering module 122 for clustering target data sources (e.g., files or shards) for performing a vectorized delete over the target data, a data retrieving module 124 for retrieving target data from the target data sources, a join module 126 for performing a join operation (or other condition) between the target data and a delete signal to generate delta arrays, and/or an array separating module 128 for separating delta array data from the join module 126 into separate delta arrays for a given file or target data source (e.g., separate delta arrays 130(1)-(p)). Distributed database system 102 can also include a data compliance module 132 that can generate a delete signal to the vectorized delete module 120 to cause deletion of data from the distributed database system 102 (or at least to cause generating or updating of a delta array for certain target data sources). In other examples, vectorized delete module 120 can receive delete signals from other sources as well, such as from one or more other components of the distributed database system 102, client device(s) 104(1)-(j), etc.

Figure 2:
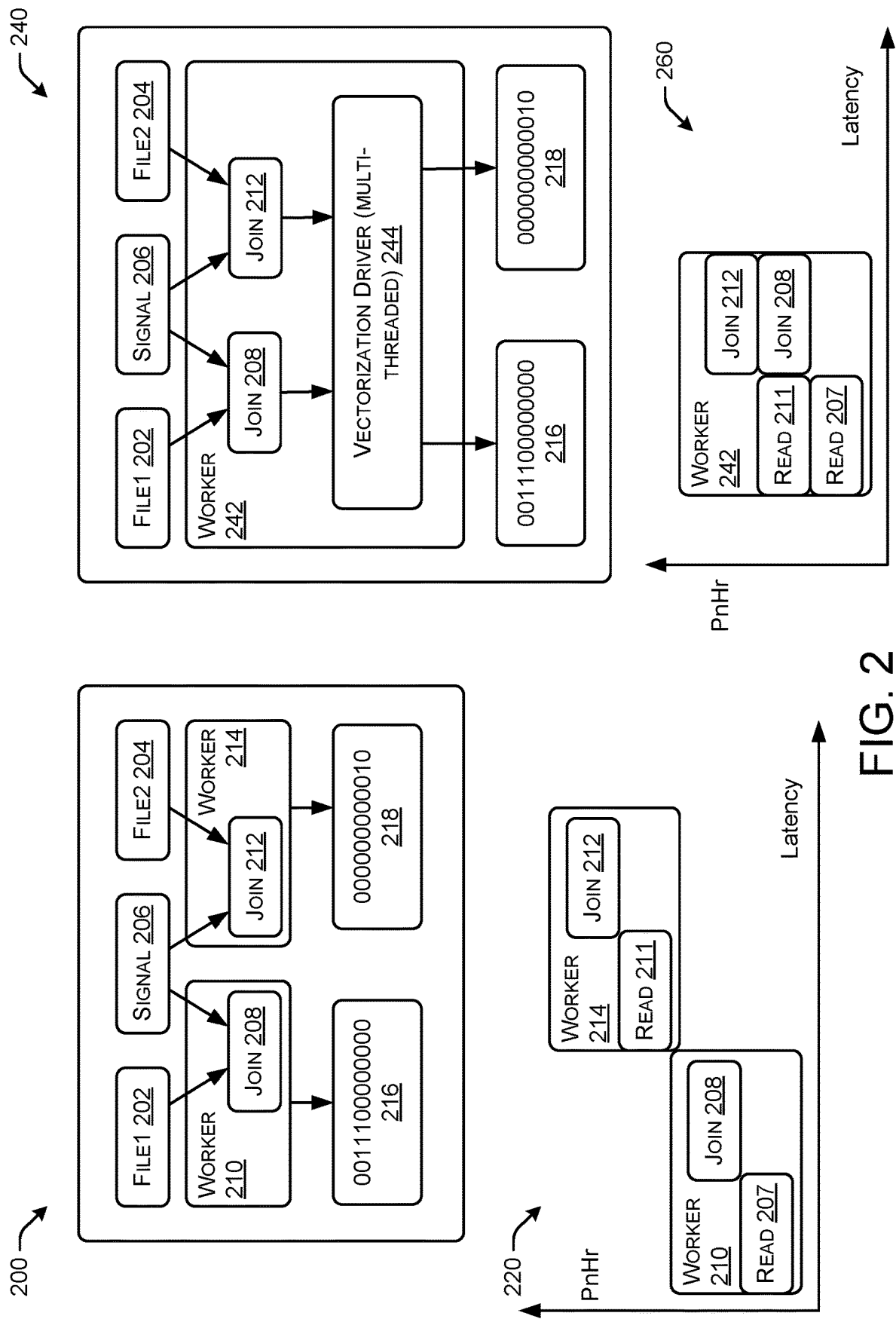
FIG. 2 is a diagram showing examples of input/output (I/O) operations and corresponding conceptual performance charts, in accordance with some aspects of the present disclosure.

FIG. 2 is a diagram showing examples of I/O operations 200, 240 and corresponding conceptual performance charts 220, 260.

I/O operation 200 can represent a conventional delete performed on File1 202 and File2 204 based on a delete signal 206. For example, the delete signal 206 can indicate parameters for deleting data from target data sources (File1 202 and File2 204), which can include generating delta arrays for each target data source. For example, delete signal 206 can include a text file that indicates data to be deleted, which can be specified based on a key value. In an example, the delete signal 206 can be the result of a delete operation, such as DELETE A FROM A JOIN B ON A.Key==B.Key, where A=File1 202 (or File2 204) and B=EXTRACT FROM Signal 206. In conventional I/O operation 200, a join operation 208 can be performed by a worker thread 210 to determine the data to be deleted from File1 202 based on signal 206 and generate corresponding delta array 216, and a join operation 212 can be performed by a worker thread 214 to determine the data to be deleted from File1 204 based on signal 206 and generate corresponding delta array 218. The worker threads 210, 214 operate one at a time, such that worker thread 210 reads data from the File1 202, performs the join 208, and generates the delta array 216 before worker thread 214 begins reading data from the File2 204. This is reflected in conceptual performance chart 220, which shows worker thread 210 performing read 207 and then join 208, and then worker thread 214 performing read 211 and then join 212.

Aspects described herein relate to a more efficient I/O operation 240. In I/O operation 240, a single worker thread 242 can read data from File1 202 and File2 204 concurrently and/or can perform the join operations 208, 212 concurrently. In one example, as part of, or prior to performing, I/O operation 240, target data for deletion can be clustered based on having a similar storage scheme, such that the deletion operation performed on the target data can be similar and accordingly performed by a multi-threaded vectorization driver 244. In an example, vectorized delete module 120 can employ the vectorized driver 244 to perform stages of the delete operation in parallel for different target data sources. In I/O operation 240, vectorization driver 244 can read data from File1 202 and File 204 in parallel, and/or can perform the join operations 208, 212 in parallel based on the data having a similar storage scheme, as described above. This can allow for time and/or processing resource savings, as reflected in conceptual performance chart 260, which shows worker thread 242 performing read 207 and 211 at the same time and then join 208 and 212 at the same time. In addition, join operation 208 may be performed for File1 202 while read 211 is performed for File2 204, or using similar resources (e.g., a same processor) as used for read 211, which can provide additional time (latency) and/or processing resource (PnHrs) savings.

Example Processes

The processes described in FIG. 3 below is illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The operations described herein may, but need not, be implemented using the distributed database system 102, vectorized delete module 120, components or modules thereof, etc. By way of example and not limitation, the method 300 is described in the context of FIGS. 1 and/or 2. For example, the operations may be performed by one or more of the distributed database system 102, vectorized delete module 120, components or modules thereof, etc.

Figure 3:
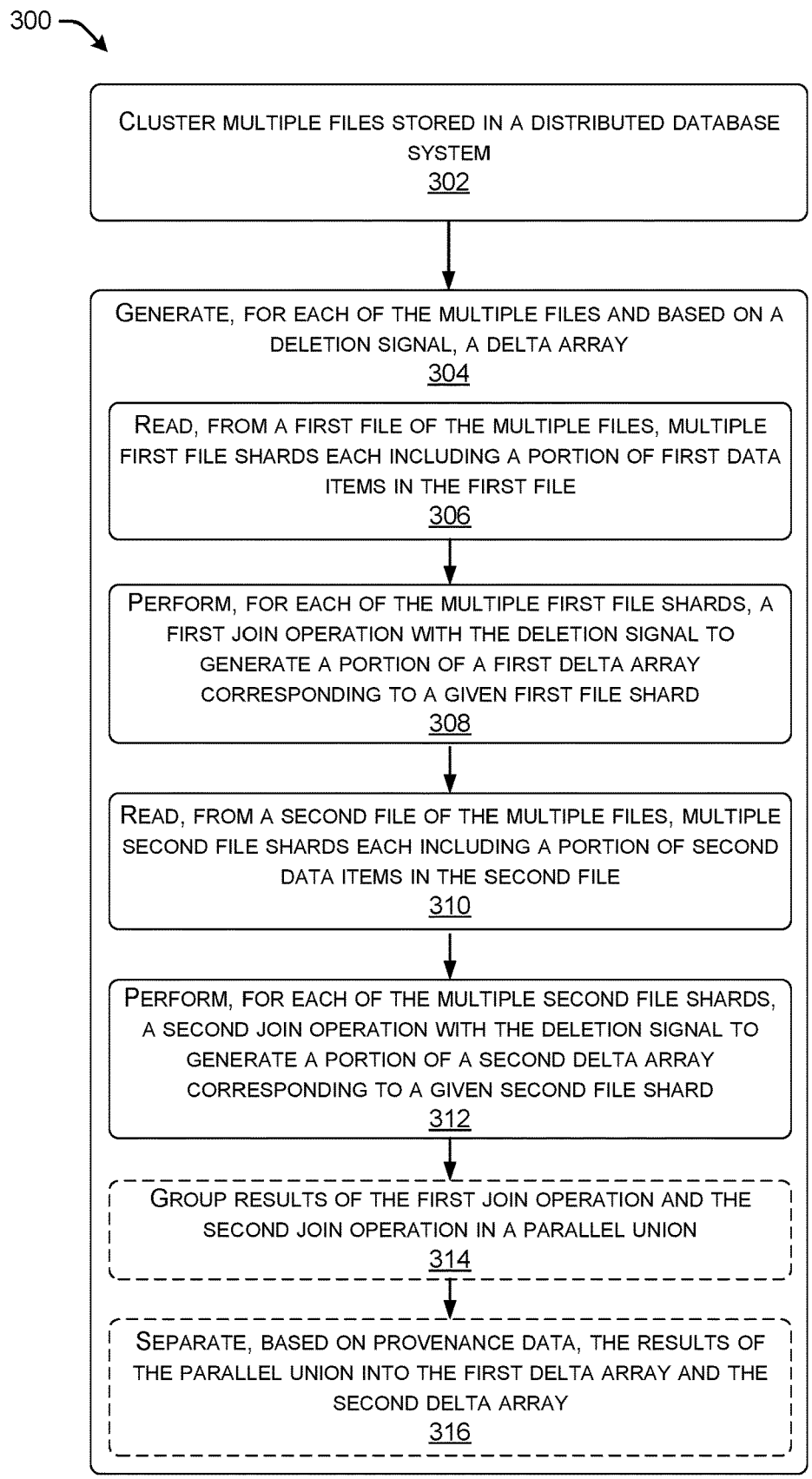
FIG. 3 is a flow diagram illustrating an example of a method for performing vectorized delete operations in distributed database systems, in accordance with some aspects of the present disclosure.

FIG. 3 is a flow diagram illustrating an example of a method 300 for performing vectorized delete operations in distributed database systems, in accordance with some aspects of the present disclosure.

At block 302, the method 300 may include clustering multiple files stored in a distributed database system. For example, a data clustering module 122, e.g., in conjunction with a processor 602, memory 604, computing device 600, distributed database system 102, vectorized delete module 120, etc., can cluster the multiple files, or at least portions thereof (e.g., shards of the multiple files) stored in the distributed database system. For example, data clustering module 122 can cluster the multiple files based on the multiple files having a similar storage scheme (e.g., a similar indexing, sharding or sorting scheme). In one example, data clustering module 122 can cluster the multiple files based on the files using a hash function or a range function based on the same or similar key to generate corresponding shards. For example, data clustering module 122 can cluster the multiple files for vectorized deletion. For example, data clustering module 122 can cluster the multiple files by associating the data for reading and joining in parallel, as described above and further herein, such that a single worker thread can perform the reading and joining, and may read from one file or shard while performing the join on another file or shard, etc. In one example, data clustering module 122 can cluster the multiple files based on determining that the multiple files correspond to the same or similar data in the distributed database system 102, that the multiple files correspond to the same client or user, that the multiple files have the similar storage scheme, and/or the like. Moreover, for example, data clustering module 122 can cluster the multiple files as part of receiving the delete signal, which may identify the files as target data sources, or can cluster the multiple files as part of another process unrelated to receiving the delete signal, etc. One specific non-limiting example of clustering files for vectorized delete is shown and described in conjunction with FIG. 4 below.

At block 304, the method 300 may include generating, for each of the multiple files and based on a deletion signal, a delta array. For example, vectorized delete module 120, e.g., in conjunction with a processor 602, memory 604, computing device 600, distributed database system 102, etc., can generate, for each of the multiple files and based on a deletion signal (e.g., a signal received from a data compliance module 132, signal 206, etc.), the delta array. As described, for example, vectorized delete module 120 can use a vectorization driver 244 to perform the vectorized deletion in generating the delta arrays, such that reads and/or joins of different files or corresponding shards can be performed in parallel.

In generating the delta array, at block 306, multiple first file shards, each including a portion of first data items in a first file, can be read from the first file of the multiple files. For example, data retrieving module 124, e.g., in conjunction with a processor 602, memory 604, computing device 600, distributed database system 102, vectorized delete module 120, etc., can read, from the first file of the multiple files (e.g., file 112(1), File1 202, etc.), multiple first file shards (e.g., shards 114(1)-(*m*)) each including a portion of first data items in the first file. As described, the multiple first file shards can be generated from the first file using a hash function or range function based on a key value and/or sorted according to that key value (or another key value of data in the file). In one example, data retrieving module 124 can retrieve a fixed-size buffer portion of the data from a given first file shard for performing a join operation, and may continue to read subsequent fixed-size buffer portions until all data is retrieved from the given first file shard (e.g., before reading a next first file shard of the first file).

In generating the delta array, at block 308, a first join operation with the deletion signal can be performed, for each of the multiple first file shards, to generate a portion of a first delta array corresponding to a given first file shard. For example, join module 126, e.g., in conjunction with a processor 602, memory 604, computing device 600, distributed database system 102, vectorized delete module 120, etc., can perform, for each of the multiple first file shards, the first join operation with the deletion signal to generate the portion of the first delta array corresponding to a given first file shard. For example, join module 126 can perform the join for each of multiple fixed-size buffer portions of the first file shard once read (e.g., at block 306), and/or may preserve an order of the buffer portions in the shards and may preserve an order of the shards in the file in generating the delta array bits. Thus, for a given shard or buffer thereof of the first file, for example, join module 126 may join the shard or buffer with the deletion signal in order, and may complete one join of a given shard or buffer (or file) before performing a next join of a next buffer of the given shard or next shard of the given file, etc. In some examples, however, data retrieving module 124 may begin reading a next buffer of the given shard or next shard of the given file while join modules 126 performs the join operation on the current buffer or shard for the first file.

In generating the delta array, at block 310, multiple second file shards, each including a portion of second data items in a second file, can be read from the second file of the multiple files. For example, data retrieving module 124, e.g., in conjunction with a processor 602, memory 604, computing device 600, distributed database system 102, vectorized delete module 120, etc., can read, from the second file of the multiple files (e.g., file 112(n), File2 204, etc.), multiple second file shards (e.g., shards 116(1)-(o)) each including a portion of second data items in the second file. As described, the multiple second file shards can be generated from the second file using a similar or same hash function or range function as the first file and/or based on a same or similar key value as the first file and/or sorted according to that key value (or another key value of data in the file). In one example, data retrieving module 124 can retrieve a fixed-size buffer portion of the data from a given second file shard for performing a join operation, and may continue to read subsequent fixed-size buffer portions until all data is retrieved from the given second file shard (e.g., before reading a next second file shard of the second file).

In generating the delta array, at block 312, a second join operation with the deletion signal can be performed, for each of the multiple second file shards, to generate a portion of a second delta array corresponding to a given second file shard. For example, join module 126, e.g., in conjunction with a processor 602, memory 604, computing device 600, distributed database system 102, vectorized delete module 120, etc., can perform, for each of the multiple second file shards, the second join operation with the deletion signal to generate the portion of the second delta array corresponding to a given second file shard. For example, join module 126 can perform the join for each of multiple fixed-size buffer portions of the second file shard once read (e.g., at block 310), and/or may preserve an order of the buffer portions in the shards and may preserve an order of the shards in the file in generating the delta array bits. Thus, for a given shard or buffer thereof of the second file, for example, join module 126 may join the shard or buffer with the deletion signal in order, and may complete one join of a given shard or buffer (or file) before performing a next join of a next buffer of the given shard or next shard of the given file, etc. In some examples, however, data retrieving module 124 may begin reading a next buffer of the given shard or next shard of the given file while join modules 126 performs the join operation on the current buffer or shard for the second file.

In aspects described herein, one or more of the above blocks can be performed in parallel to save latency and/or processing resources. For example, data retrieving module 124 can concurrently retrieve data (e.g., fixed-size buffers) from the first and second files. In another example, join module 126 can perform the joins of the first and second files, or associated shards or fixed-size buffers, in parallel. In yet another example, data retrieving module 124 can retrieve data from one of the files (or associated shards) while join module 126 performs a join for a different file or shard (or for a shard of the same file). Moreover, for example, vectorized delete module 120 can similarly perform read operations and join operations for one or more other files concurrently with the first and second files as well, where the one or more other files can also be clustered based on using a similar storage scheme, as described above.

In generating the delta array, optionally at block 314, results of the first join operation and the second join operation can be grouped in a parallel union. For example, join module 126, e.g., in conjunction with a processor 602, memory 604, computing device 600, distributed database system 102, vectorized delete module 120, etc., can output the delta array results of the join operations to the parallel union along with provenance data that indicates to which file the outputted delta array bits belong. The delta array bits may be outputted to the parallel union as they are generated. As such, for example, the parallel union may include a mixture of delta array bits for the first file and the second file (and/or additional files), but the delta array bits for a given file are in order of the data read from the file.

In generating the delta array, optionally at block 316, the results of the parallel union can be separated, based on the provenance data, into the first delta array and the second delta array. For example, array separating module 128, e.g., in conjunction with a processor 602, memory 604, computing device 600, distributed database system 102, vectorized delete module 120, etc., can separate, based on the provenance data, the results of the parallel union into the first delta array and the second delta array. In an example, array separating module 128 can obtain the provenance data indicated for each bit value by the join module 126, and can accordingly separately output the bits, in order, into a first delta array and second delta array (and/or additional delta array(s) for additional files). As described, the provenance data can include an identifier to indicate the file to which the delta array bit belongs, and array separating module 128 can separate the bits based on this identifier. For example, array separating module 128 can separate the delta array bits into delta arrays 130(1)-(p), as described in FIG. 1, delta arrays 216, 218, as described in FIG. 2, etc.

Figure 4:
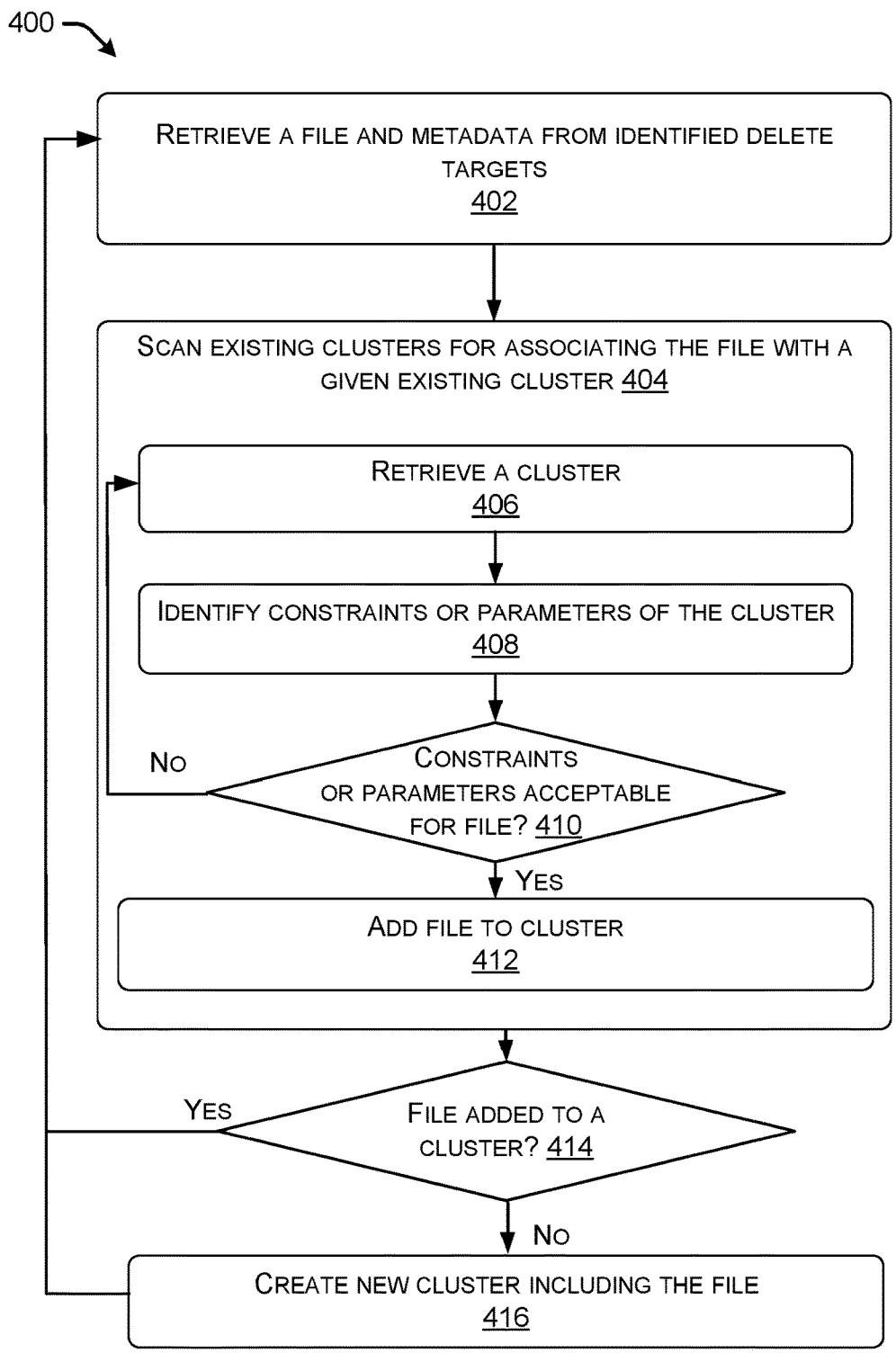
FIG. 4 is a flow diagram illustrating an example of a method for clustering target data sources for a vectorized delete operation, in accordance with some aspects of the present disclosure.

FIG. 4 is a flow diagram illustrating an example of a method 400 for clustering target data sources for a vectorized delete operation, in accordance with some aspects of the present disclosure.

At block 402, the method 400 may include retrieving a file and metadata from identified delete targets. For example, a data clustering module 122, e.g., in conjunction with a processor 602, memory 604, computing device 600, distributed database system 102, vectorized delete module 120, etc., can retrieve the file and metadata from the identified delete targets. For example, each file can include metadata that stores information regarding the file, such as a sharding scheme used in storing shards of the file, key values or the type of value (e.g., the column) used in performing the sharding, a type of function used (e.g., hash function, range function, etc.), locations of the shards in the distributed file system, split points of the shards if range partitioning is used, etc. Given a set of target data sources for deletion (e.g., delete targets, which may include files as described herein), which may be identified in the delete signal, data clustering module 122 can read the metadata associated with each target to perform the clustering, as described above and further herein in various examples. In one example, the metadata can also store the delta array for the file, which can be generated as part of the delete process described herein.

At block 404, the method 400 may include scanning existing clusters for associating the file with a given existing cluster. For example, a data clustering module 122, e.g., in conjunction with a processor 602, memory 604, computing device 600, distributed database system 102, vectorized delete module 120, etc., can scan existing clusters for associating the file with a given existing cluster. This can be performed for each file retrieved as a target data source (delete target) at block 402. For each target data source, each existing cluster can be scanned to try to additionally cluster the file if or until an acceptable cluster is found.

In scanning the existing clusters, at block 406, a cluster can be retrieved (e.g., a first cluster). For example, a data clustering module 122, e.g., in conjunction with a processor 602, memory 604, computing device 600, distributed database system 102, vectorized delete module 120, etc., can retrieve the cluster. As described further herein, data clustering module 122 can have created the cluster based on previous files, and the cluster may already include one or more files.

In scanning the existing clusters, at block 408, constraints or parameters of the cluster can be identified. For example, a data clustering module 122, e.g., in conjunction with a processor 602, memory 604, computing device 600, distributed database system 102, vectorized delete module 120, etc., can identify the constraints or parameters of the cluster. In an example, a constraint can include a join algorithm used for the cluster. For example, a join algorithm may be preferred over other types to become a delete joiner based on its input. For example, when input is sorted by join key, a sort-merge join may be more efficient; when input not sorted by join key, hash join may be more efficient; when delete signal fits in memory, hash join may be more performant. In an example, data clustering module 122 can select a join algorithm during script compile time, and the choice of join algorithm can correspond to a constraint clustering delete targets—e.g., when sorted-merge join is chosen, an unsorted shard may not be merged with a sorted shard; when sorted-merge join is chosen for a shard, another shard consumed by hash join may not be clustered together, vice versa, etc.

Additional constraints or parameters of the cluster can correspond to data characteristics—e.g., a shard that is too big in size may not be regrouped with its minion counterparts; a shard skew in the join key may not be grouped together with non-skew shards, etc., for example, to ensure load-balancing, not to create a single per bottleneck, etc. Other constraints may correspond to shards in range partitioning may not be clustered with hash partitioning, vice versa; delete targets with different types of join key(s) may not be clustered together, etc. In any case, for example, data clustering module 122 can identify the constraints associated with a cluster, and may determine whether the file complies with the constraints.

In scanning the existing clusters, at block 410, it can be determined whether the constraints or parameters are acceptable for the file. For example, a data clustering module 122, e.g., in conjunction with a processor 602, memory 604, computing device 600, distributed database system 102, vectorized delete module 120, etc., can determine whether the constraints or parameters of the cluster are acceptable for the file. For example, data clustering module 122 can determine whether the file complies with the constraints, whether the file as parameters that are in-line or compliant with those of the cluster, etc. In one example, for hash partitioning of the file and cluster of files, data clustering module 122 can check of the files in the cluster have the same hash function as the file being considered for the cluster, or if a smallest common denominator for a key value can be established for the files in the cluster and the file being considered. In one example, for range partitioning of the file and cluster of files, data clustering module 122 can check if split points of the cluster of files (e.g., split points for the key value used in generating the shards) can be redefined to include the split points used in the file being considered (and/or if redefining the split point can ensure desired load balancing).

If the constraints or parameters are acceptable for the file at 410, at block 412, the file can be added to the cluster. For example, a data clustering module 122, e.g., in conjunction with a processor 602, memory 604, computing device 600, distributed database system 102, vectorized delete module 120, etc., can add the file to the cluster. If not, a next cluster can be retrieved at 406, and the process of scanning the existing clusters may continue until there are no clusters left.

At block 414, the method 400 may include determining whether the file was added to a cluster. For example, a data clustering module 122, e.g., in conjunction with a processor 602, memory 604, computing device 600, distributed database system 102, vectorized delete module 120, etc., can determine whether the file was added to a cluster. If so, a next file of the identified delete targets can be retrieved for possible association with an existing cluster, as described above. If the file was not added to a cluster, at block 416, a new cluster including the file can be created. For example, a data clustering module 122, e.g., in conjunction with a processor 602, memory 604, computing device 600, distributed database system 102, vectorized delete module 120, etc., can create the new cluster including the file. In one example, data clustering module 122 can maintain the clusters with the identified files, which may include maintaining metadata for the cluster (e.g., the common sharding scheme, key value(s), split points, etc.) for later identifying the constraints or parameters of the files in the cluster. In another example, when data clustering module 122 identifies the constraints and/or parameters of the files in the cluster (at block 408) by evaluating each file in the cluster during scanning.

Figure 5:
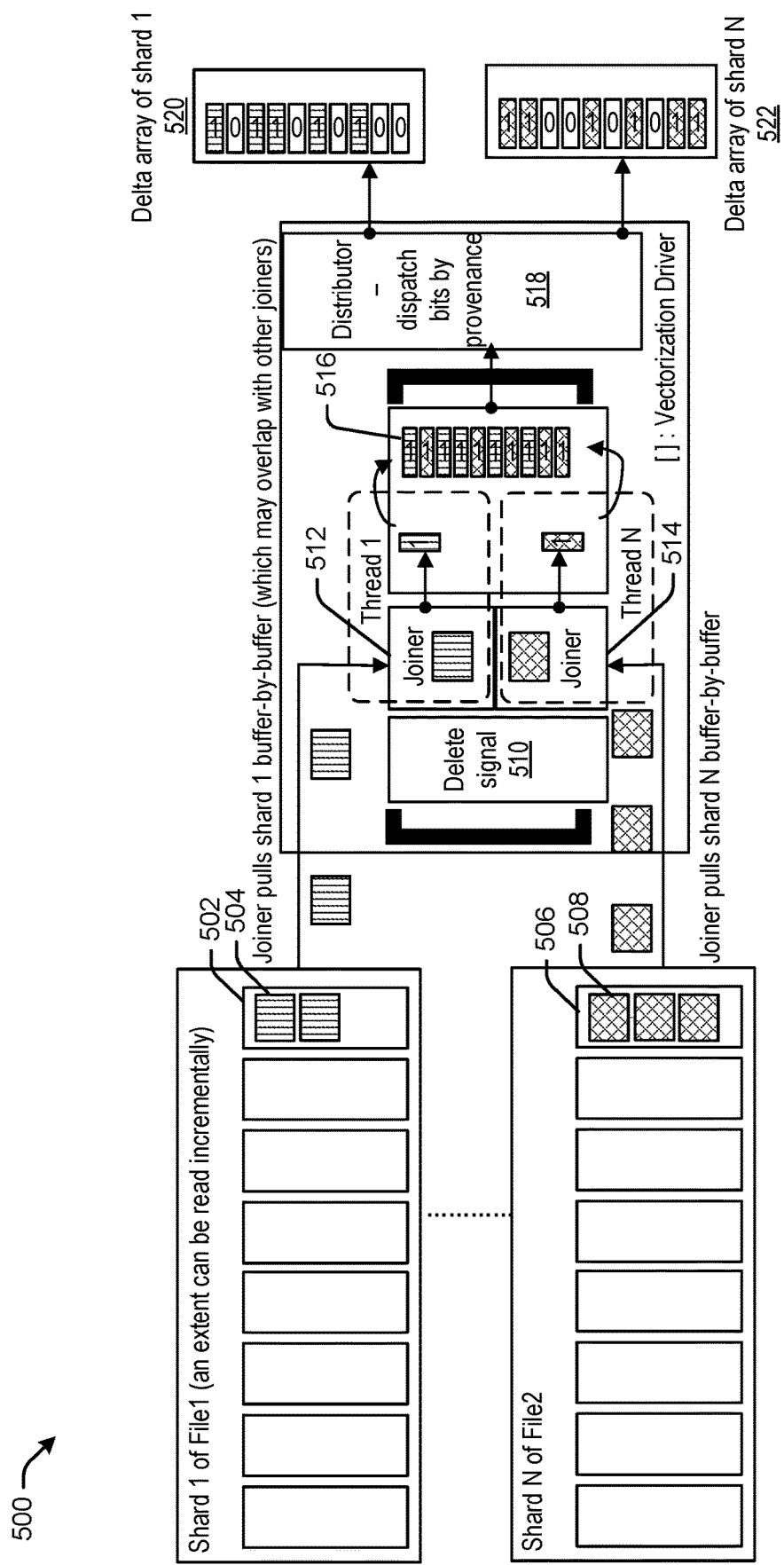
FIG. 5 is a conceptual diagram of a data flow for performing a vectorized delete operation, in accordance with some aspects of the present disclosure.

FIG. 5 is a conceptual diagram of a data flow 500 for performing a vectorized delete operation, in accordance with aspects described herein. In data flow 500, Shard 1 of File1 and Shard N of File2 can be clustered (e.g., by a data clustering module 122) for performing the vectorized delete operation (e.g., based on determining that the shards have similar storage schemes or related properties). For example, Shard 1 can store multiple extents 502, each having input data records 504, and Shard N can store multiple extents 506 each having data records 508. A delete signal 510 can be received for deleting records from File1 and File2. A vectorization driver (e.g., as included in a vectorized delete module 120) can include a thread that can read Shard 1 (e.g., buffer-by-buffer) and can have a joiner 512 (e.g., join module 126) to join the data read from Shard 1 with the delete signal 510, and a separate thread that can read Shard N (e.g., buffer-by-buffer) and can have a joiner 514 (e.g., join module 126) to join the data read from Shard N with the delete signal 510.

As described, for example, joiner 512 and joiner 514 can output delta array bits to a parallel union 516 as the bits are generated, along with provenance data indicating to which file the bit below, which row the bits indicate for deletion, etc. Based on this provenance data, a distributor 518 (e.g., array separating module 128) can dispatch the bits to corresponding delta arrays 520, 522 (e.g., a delta array for the file identifier in the provenance data for the bit and/or in a row position within the shard as indicated in the provenance data for the bit).

In this example, the vectorization driver can read multiple homogenous shards from different streams clustered together, where each shard can be a partition of a bigger stream (e.g., a stream may be on the order of 10s or 100s of terabytes, whereas a shard can be on the order of 10 gigabytes, may include many extents, where an extent is consumed buffer by buffer by reader/scanner, etc.). The vectorization driver can simultaneously join a shared delete signal with multiple shards, as described. As a shard may be too big to be consumed by a single disk I/O, the joiners 512, 514 can read the shard from disk (e.g., hard drive) buffer-by-buffer, where a buffer can be filled by I/Os to disk to fetch data. Between each fetch, a CPU can wait for I/O to return and the buffer to return by disk controller. As the CPU operates at a much faster frequency than disk, the CPU wait time for a buffer can proportionally long when compared to I/O time. In vectorized delete, the CPU can use the wait time to fetch a next buffer from a different input, and essentially perform scan and join for different shards in parallel. In cluster of computing nodes, the extents may be stored on different nodes for load balancing with redundancy. Thus, the above parallel I/Os mentioned above are unlikely to stress a single node's disk. As I/O and join can be performed in parallel, in this regard, the CPU utilization can be much better and I/O throughput can be much improved. Each joiner 512, 514 can be assigned its own thread, and the join results can be delta bits; the results from different delete targets can be buffered together in the parallel union, as described, along with provenance data. Moreover, for example, using first-in first-out (FIFO) order to perform the vectorized delete can allow for preserving the order of data of input in generating the output.

Illustrative Computing Device

Figure 6:
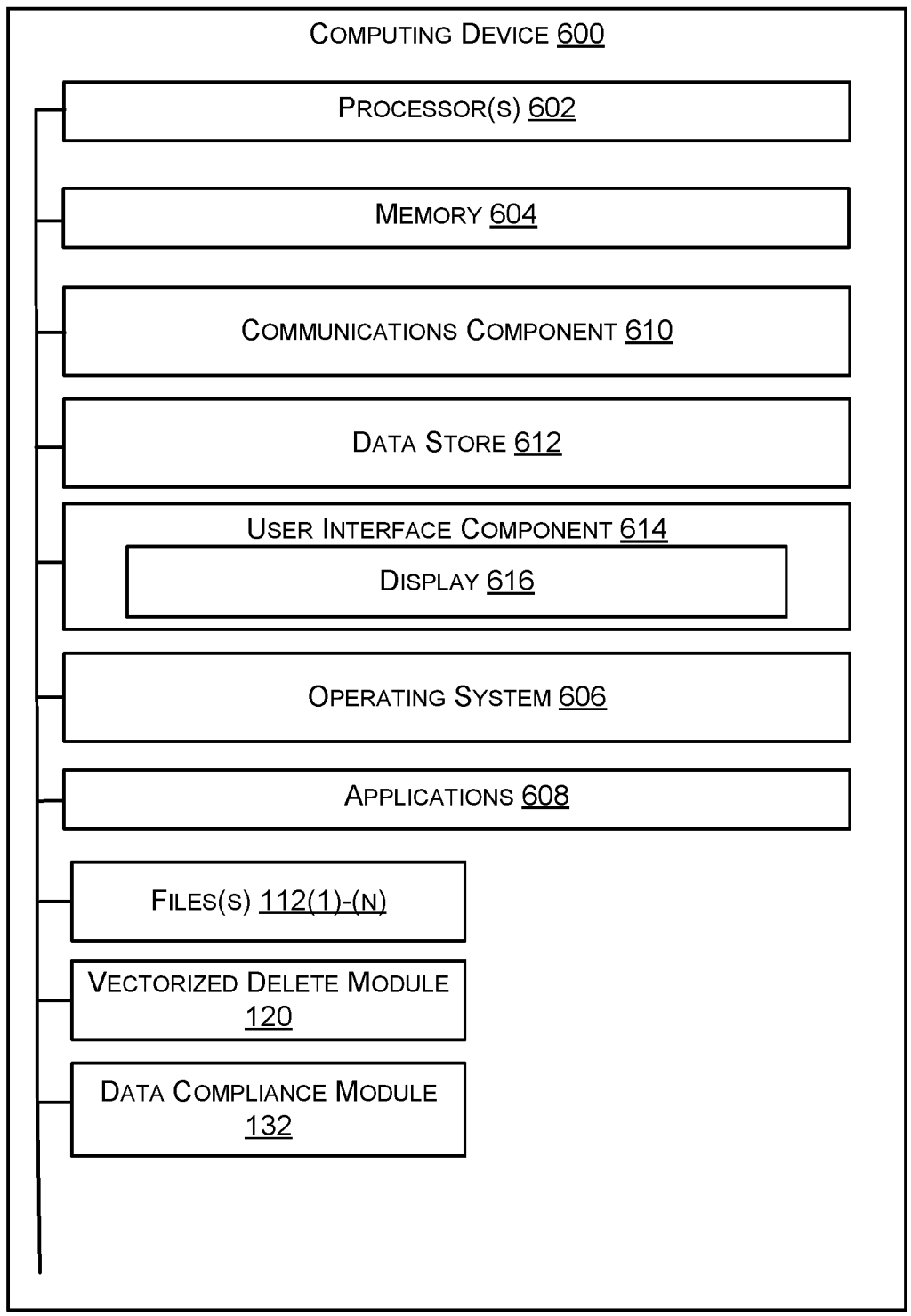
FIG. 6 is a block diagram illustrating an example of a hardware implementation for a computing device(s), in accordance with some aspects of the present disclosure.

Referring now to FIG. 6, an example of a computing device(s) 600, such as distributed database system 102, or a portion thereof, such as one or more servers that store data or manage operations on the distributed database system 102, process queries to the distributed database system 102, etc. In one example, the computing device(s) 600 includes the processor 602 for carrying out processing functions associated with one or more of components and functions described herein. The processor 602 can include a single or multiple set of processors or multi-core processors. Moreover, the processor 602 may be implemented as an integrated processing system and/or a distributed processing system. In an example, the processor 602 includes, but is not limited to, any processor specially programmed as described herein, including a controller, microcontroller, a computer processing unit (CPU), a graphics processing unit (GPU), an application specific integrated circuit (ASIC), a field programmable gate array (FPGA), a system on chip (SoC), or other programmable logic or state machine. Further, the processor 602 may include other processing components such as one or more arithmetic logic units (ALUs), registers, or control units.

In an example, the computing device 600 also includes the memory 604 for storing instructions executable by the processor 602 for carrying out the functions described herein. The memory 604 may be configured for storing data and/or computer-executable instructions defining and/or associated with the operating system 606, the files 112(1)-(*n*), vectorized delete module 120, data compliance module 132, etc. An example of memory 604 may include, but is not limited to, a type of memory usable by a computer, such as random access memory (RAM), read only memory (ROM), tapes, magnetic discs, optical discs, volatile memory, non-volatile memory, and any combination thereof. In an example, the memory 604 may store local versions of applications being executed by processor 602.

The example computing device 600 also includes a communications component 610 that provides for establishing and maintaining communications with one or more parties utilizing hardware, software, and services as described herein. The communications component 610 may carry communications between components on the computing device 600, as well as between the computing device 600 and external devices, such as devices located across a communications network and/or devices serially or locally connected to the computing device 600. For example, the communications component 610 may include one or more buses, and may further include transmit chain components and receive chain components associated with a transmitter and receiver, respectively, operable for interfacing with external devices. In an implementation, for example, the communications component 610 may include a connection to communicatively couple the client devices 104(1)-(*n*) to the processor 602.

The example computing device 600 also includes a data store 612, which may be any suitable combination of hardware and/or software, that provides for mass storage of information, databases, and programs employed in connection with implementations described herein. For example, the data store 612 may be a data repository for the operating system 606 and/or the applications 608.

The example computing device 600 also includes a user interface component 614 operable to receive inputs from a user of the computing device 600 and further operable to generate outputs for presentation to the user. The user interface component 614 may include one or more input devices, including but not limited to a keyboard, a number pad, a mouse, a touch-sensitive display (e.g., display 616), a digitizer, a navigation key, a function key, a microphone, a voice recognition component, any other mechanism capable of receiving an input from a user, or any combination thereof. Further, the user interface component 614 may include one or more output devices, including but not limited to a display (e.g., display 616), a speaker, a haptic feedback mechanism, a printer, any other mechanism capable of presenting an output to a user, or any combination thereof.

In an implementation, the user interface component 614 may transmit and/or receive messages corresponding to the operation of the operating system 606 and/or the applications 608. In addition, the processor 602 executes the operating system 606 and/or the applications 608, and the memory 604 or the data store 612 may store them.

Further, one or more of the subcomponents of the files 112(1)-(*n*), vectorized delete module 120, data compliance module 132, may be implemented in one or more of the processor 602, the applications 608, the operating system 606, memory 604, and/or the user interface component 614 such that the subcomponents of the files 112(1)-(*n*), vectorized delete module 120, data compliance module 132, may be spread out between the components/subcomponents of the computing device 600.

In closing, although the various embodiments have been described in language specific to structural features and/or methodological acts, it is to be understood that the subject matter defined in the appended representations is not necessary limited to the specific features or acts described. Rather, the specific features and acts are disclosed as example forms of implementing the claimed subject matter.

What is claimed is:

1. A computer-implemented method for performing a vectorized delete in a distributed database system, comprising:
    clustering multiple files stored in the distributed database system, wherein the clustering is based at least in part on a similarity in a storage scheme used to store data in the multiple files; and
    generating, for each of the multiple files and based on a deletion signal, a delta array including multiple bits representing data items in the file and indicating, based on bit value, target data items to be deleted from the file, wherein generating, for each of the multiple files, the delta array includes:
reading, from a first file of the multiple files, multiple first file shards each including a portion of first data items in the first file;
performing, for each of the multiple first file shards, a first join operation with the deletion signal to generate a portion of a first delta array corresponding to a given first file shard;
reading, from a second file of the multiple files, multiple second file shards each including a portion of second data items in the second file; and
performing, for each of the multiple second file shards, a second join operation with the deletion signal to generate a portion of a second delta array corresponding to a given second file shard,
wherein reading at least one second file shard of the multiple second file shards is performed before the first join operation on at least one first file shard of the multiple first file shards is completed.

2. The computer-implemented method of claim 1, wherein reading at least one first file shard of the multiple first file shards is performed in parallel with reading at least one second file shard of the multiple second file shards.

3. The computer-implemented method of claim 2, wherein reading at least one first file shard of the multiple first file shards and reading at least one second file shard of the multiple second file shards are performed using a single worker thread.

4. The computer-implemented method of claim 2, wherein reading the at least one first file shard of the multiple first file shards includes separately pulling multiple first buffer portions of the at least one first file shard, wherein performing the first join operation includes performing the first join operation over each of the multiple first buffer portions, wherein reading the at least one second file shard of the multiple second file shards includes separately pulling multiple second buffer portions of the at least one second file shard, wherein performing the second join operation includes performing the second join operation over each of the multiple second buffer portions, and wherein pulling at least one of the multiple first buffer portions is performed in parallel with pulling at least one of the multiple second buffer portions.

5. The computer-implemented method of claim 1, wherein performing the first join operation is performed in parallel with performing the second join operation.

6. The computer-implemented method of claim 5, wherein the first join operation and the second join operation are performed using a single worker thread.

7. The computer-implemented method of claim 1, wherein generating, for each of the multiple files, the delta array further includes:
grouping results of the first join operation and the second join operation in a parallel union along with provenance data indicating to which file the results are associated; and
separating, based on the provenance data, the results of the parallel union into the first delta array and the second delta array.

8. The computer-implemented method of claim 1, wherein the similarity in the storage scheme used to store data in the multiple files corresponds to a shard similarity in the multiple first file shards and the multiple second file shards.

9. The computer-implemented method of claim 8, wherein the shard similarity includes a same hash key or range key used to generate the multiple first file shards and the multiple second file shards.

10. The computer-implemented method of claim 1, wherein the similarity in the storage scheme used to store data in the multiple files corresponds to an indexing similarity used to index the data stored in each of the multiple files.

11. The computer-implemented method of claim 1, wherein the similarity in the storage scheme used to store data in the multiple files corresponds to a sorting similarity used to sort the data stored in each of the multiple files.

12. A device for performing a vectorized delete in a distributed database system, comprising:
a memory storing instructions; and
at least one processor coupled to the memory and configured to execute the instructions to:
cluster multiple files stored in the distributed database system, wherein the clustering is based at least in part on a similarity in a storage scheme used to store data in the multiple files; and
generate, for each of the multiple files and based on a deletion signal, a delta array including multiple bits representing data items in the file and indicating, based on bit value, target data items to be deleted from the file, wherein generating, for each of the multiple files, the delta array includes:
reading, from a first file of the multiple files, multiple first file shards each including a portion of first data items in the first file;
performing, for each of the multiple first file shards, a first join operation with the deletion signal to generate a portion of a first delta array corresponding to a given first file shard;
reading, from a second file of the multiple files, multiple second file shards each including a portion of second data items in the second file; and
performing, for each of the multiple second file shards, a second join operation with the deletion signal to generate a portion of a second delta array corresponding to a given second file shard,
wherein reading at least one second file shard of the multiple second file shards is performed before the first join operation on at least one first file shard of the multiple first file shards is completed.

13. The device of claim 12, wherein the at least one processor is configured to execute the instructions to read at least one first file shard of the multiple first file shards in parallel with reading at least one second file shard of the multiple second file shards.

14. The device of claim 13, wherein the at least one processor is configured to execute the instructions to read at least one first file shard of the multiple first file shards and read at least one second file shard of the multiple second file shards using a single worker thread.

15. The device of claim 13, wherein the at least one processor is configured to execute the instructions to read the at least one first file shard of the multiple first file shards at least in part by separately pulling multiple first buffer portions of the at least one first file shard, wherein the at least one processor is configured to execute the instructions to perform the first join operation at least in part by performing the first join operation over each of the multiple first buffer portions, wherein the at least one processor is configured to execute the instructions to read the at least one second file shard of the multiple second file shards at least in part by separately pulling multiple second buffer portions of the at least one second file shard, wherein the at least one processor is configured to execute the instructions to perform the second join operation at least in part by performing the second join operation over each of the multiple second buffer portions, and wherein the at least one processor is configured to execute the instructions to pull at least one of the multiple first buffer portions is performed in parallel with pulling at least one of the multiple second buffer portions.

16. The device of claim 12, wherein the at least one processor is configured to execute the instructions to perform the first join operation in parallel with performing the second join operation.

17. The device of claim 12, wherein the at least one processor is configured to execute the instructions to generate, for each of the multiple files, the delta array at least in part by:
   grouping results of the first join operation and the second join operation in a parallel union along with provenance data indicating to which file the results are associated; and
   separating, based on the provenance data, the results of the parallel union into the first delta array and the second delta array.

18. The device of claim 12, wherein the similarity in the storage scheme used to store data in the multiple files corresponds to a shard similarity in the multiple first file shards and the multiple second file shards, wherein the shard similarity includes a same hash key or range key used to generate the multiple first file shards and the multiple second file shards.

19. A non-transitory computer-readable device storing instructions thereon that, when executed by at least one computing device, causes the at least one computing device to perform operations comprising:
   clustering multiple files stored in the distributed database system, wherein the clustering is based at least in part on a similarity in a storage scheme used to store data in the multiple files; and
   generating, for each of the multiple files and based on a deletion signal, a delta array including multiple bits representing data items in the file and indicating, based on bit value, target data items to be deleted from the file, wherein generating, for each of the multiple files, the delta array includes:
      reading, from a first file of the multiple files, multiple first file shards each including a portion of first data items in the first file;
      performing, for each of the multiple first file shards, a first join operation with the deletion signal to generate a portion of a first delta array corresponding to a given first file shard;
      reading, from a second file of the multiple files, multiple second file shards each including a portion of second data items in the second file; and
      performing, for each of the multiple second file shards, a second join operation with the deletion signal to generate a portion of a second delta array corresponding to a given second file shard,
      wherein reading at least one second file shard of the multiple second file shards is performed before the first join operation on at least one first file shard of the multiple first file shards is completed.

20. The non-transitory computer-readable device of claim 19, wherein reading at least one first file shard of the multiple first file shards is performed in parallel with reading at least one second file shard of the multiple second file shards.

* * * * *